March 22, 1927.  1,622,257
H. D. STEVENS
TUBE STOCK CUTTING APPARATUS
Filed Oct. 25, 1923   5 Sheets-Sheet 1
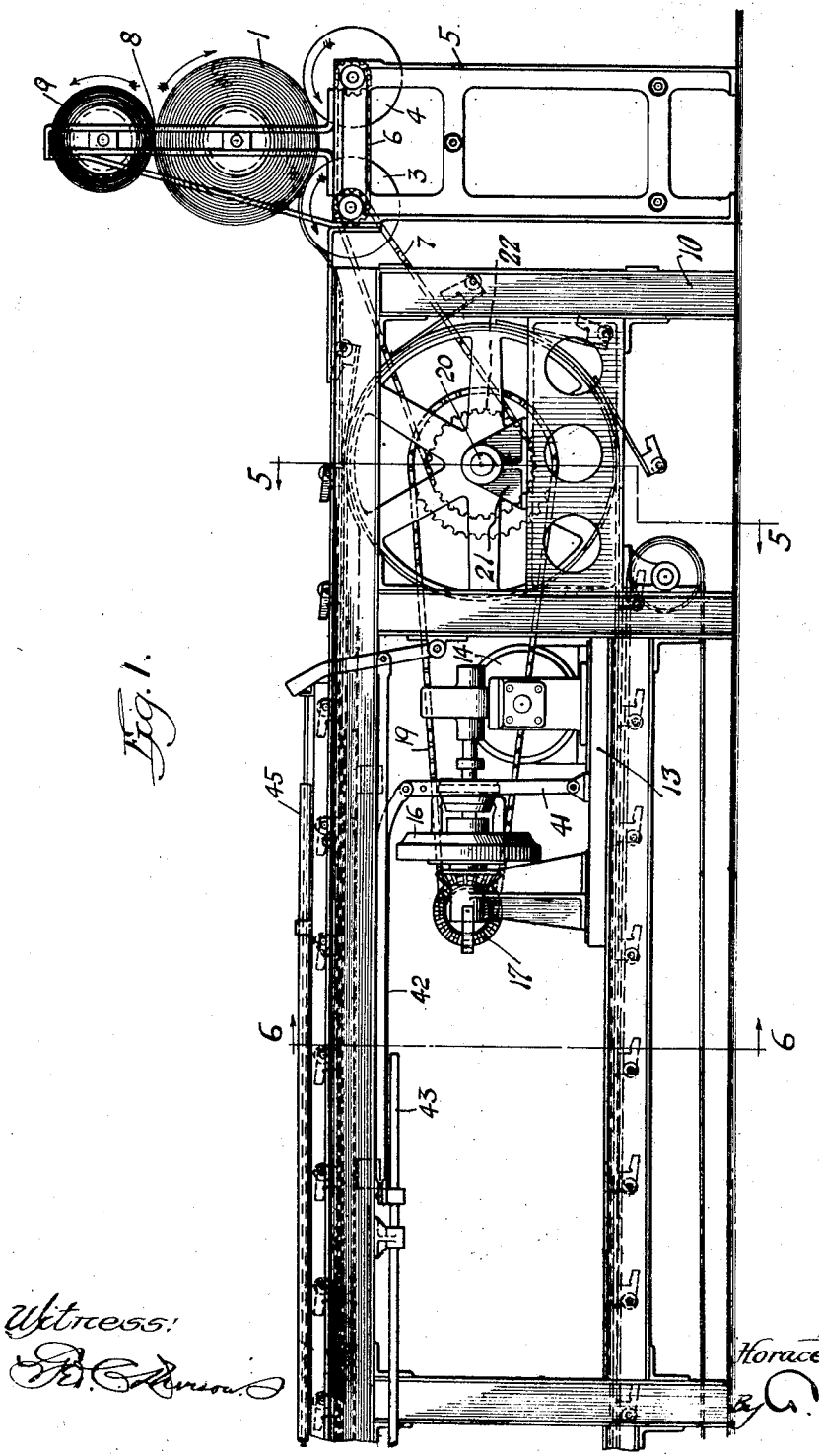

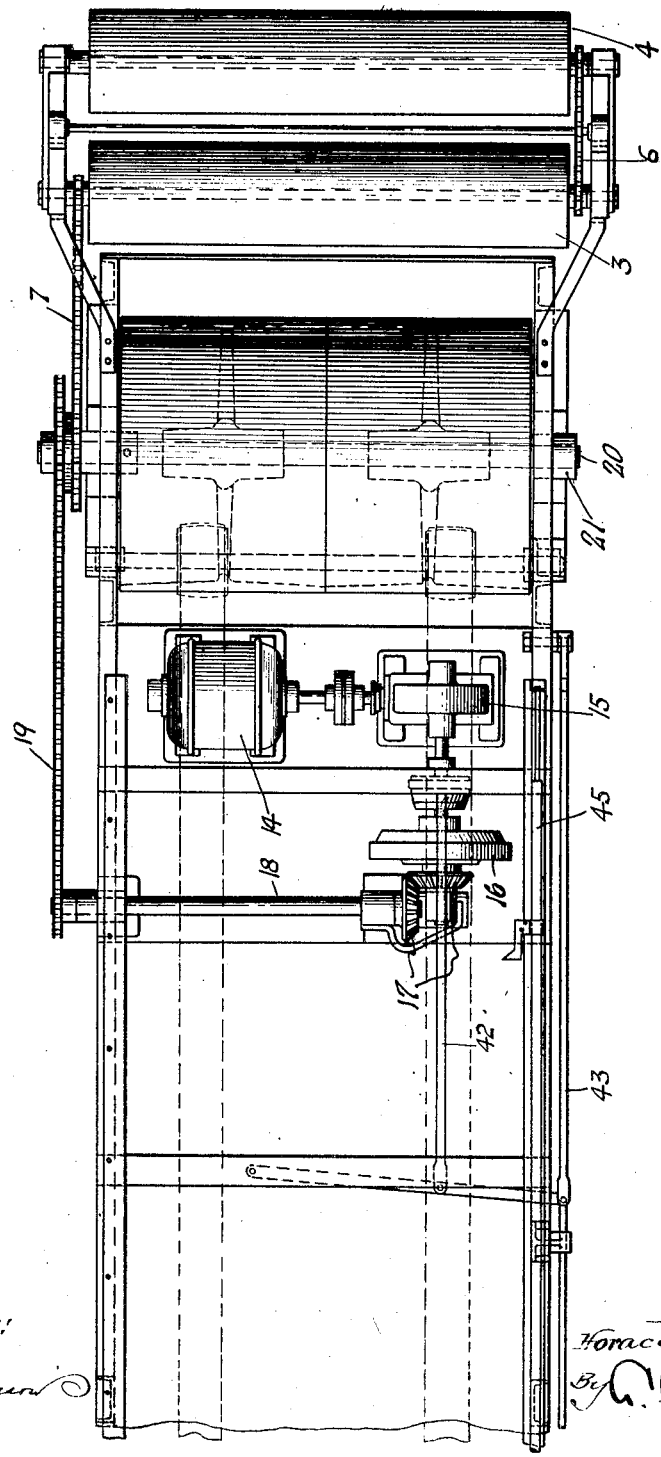

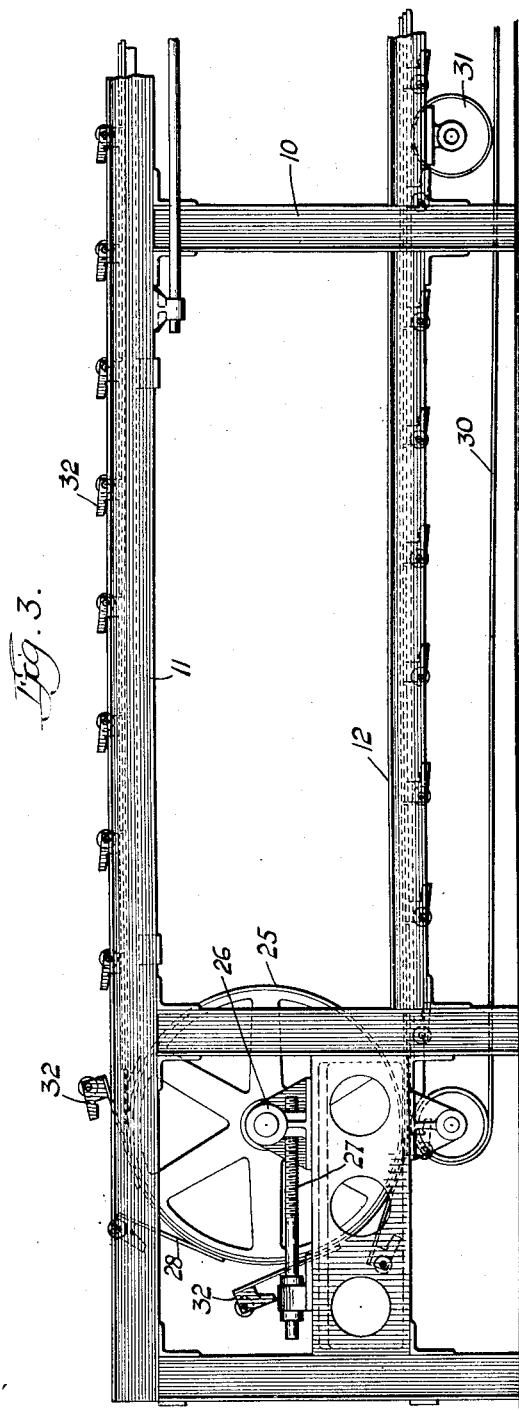

March 22, 1927.
H. D. STEVENS
1,622,257
TUBE STOCK CUTTING APPARATUS
Filed Oct. 25, 1923  5 Sheets-Sheet 4
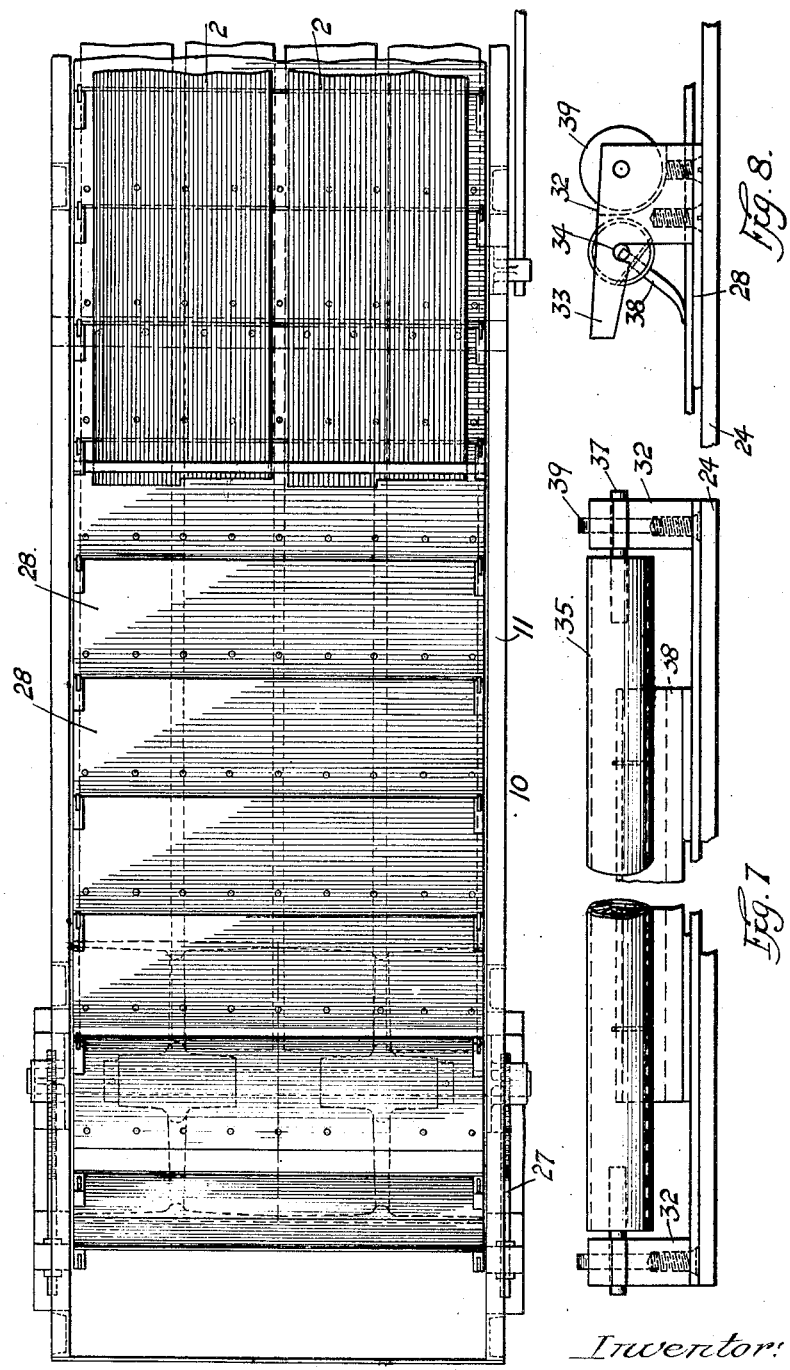
Witness:
Inventor:
Horace D. Stevens March 22, 1927.
H. D. STEVENS
1,622,257
TUBE STOCK CUTTING APPARATUS
Filed Oct. 25, 1923   5 Sheets-Sheet 5
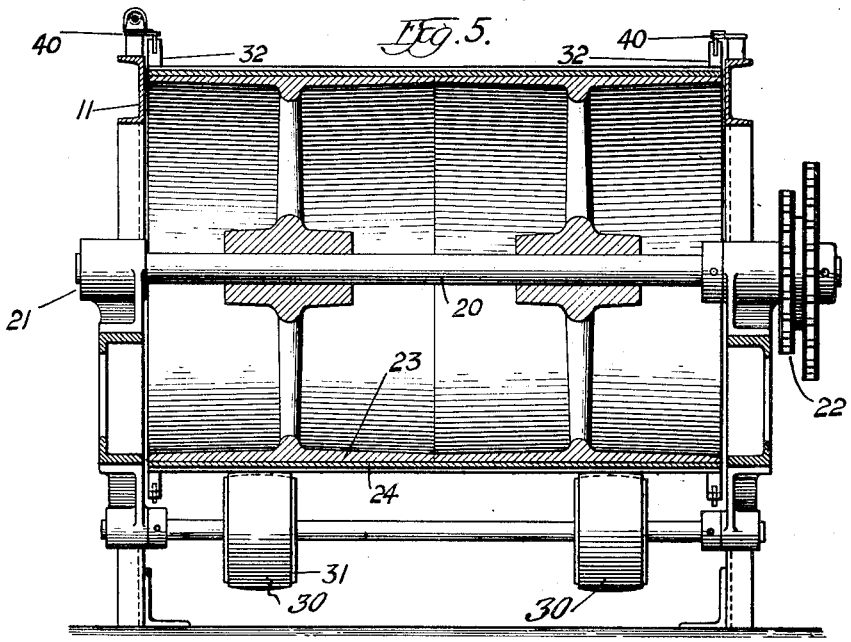
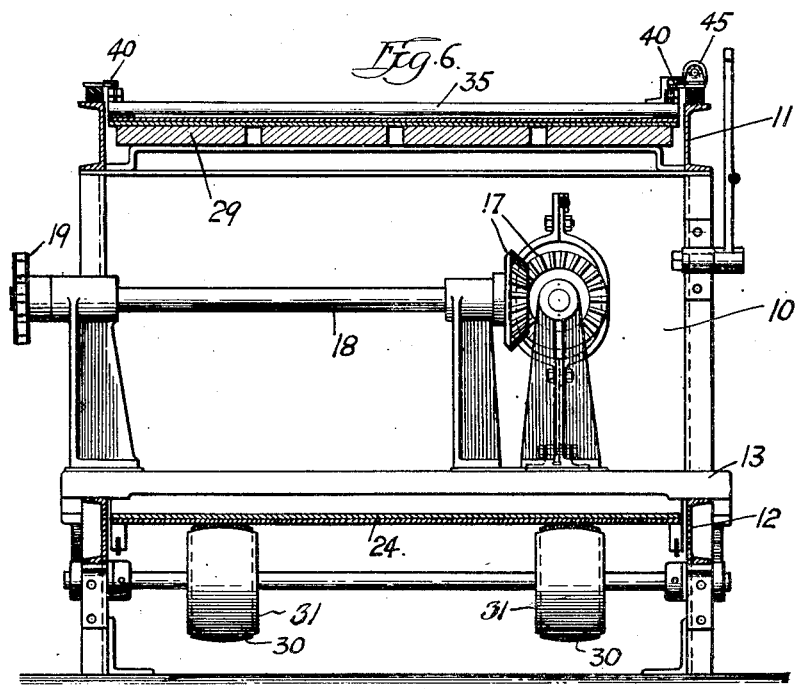

Patented Mar. 22, 1927.                                                1,622,257

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

TUBE STOCK CUTTING APPARATUS.

Application filed October 25, 1923. Serial No. 670,650.

This invention relates to the manufacture of rubber tubes used in pneumatic tire casings and particularly to apparatus for use in the preparation of the rubber sheeting from which the tube is made. The apparatus is designed to assist in the cutting of the sheet rubber blanks and to a certain extent to replace hand labor in this operation.

The general practice of cutting sheet rubber for tubes, as far as known to me, is to mount a roll of liner material with sheeted rubber rolled therein upon a stand which is located at one end of a long cutting table having a metal cutting surface thereon. Two operators are required, one of whom wraps the forward ends of the two strips of rubber around a stick or pole and draws out the rubber from between the liner, while the other turns a crank on the roll of material so as to avoid too great strain being placed upon the soft, uncured rubber. The operator draws forward enough of the material to make blanks for the tube and then cuts off the rubber at the proper length. The two operators then lift the cut blanks off the table and "book them," that is, place them between layers of liner material secured to a long board.

The operation as described above has prevailed, to my knowledge in tire factories to the present day, and it is the object of my invention to supplant this procedure by the construction of an apparatus which will dispense with a portion of the hand operations and permit the employment of a single operator where two have been required, and to do the work more quickly and easily.

In the drawings there is shown one form or embodiment of the invention, but it will be appreciated that the showing is of an example only and variations or modifications of the invention may be made within the scope and substance of the claims.

In the drawings:

Figure 1 is a side elevation of the end of the apparatus at which the rolled-up stock is located;

Figure 2 is a plan view, the belt or movable table being removed to disclose the parts below;

Figure 3 is a side elevation of the machine, being a continuation to the left of the parts shown in Figure 1;

Figure 4 is a plan of Figure 3;

Figure 5 is a section on the line 5—5 of Figure 1;

Figure 6 is a section on the line 6—6 of Figure 1;

Figure 7 is an enlarged side view of the stock clamp or drag bar; and

Figure 8 is an end view thereof.

In the embodiment of the invention, the roll of liner containing the two rubber strips or plies of rubber sheeting as received in the tube room is indicated at 1, the parallel, spaced plies being indicated at 2. The roll 1 is supported or cradled in two parallel rolls 3 and 4 which are journaled at the top of a stand or rack 5. The rolls are interconnected by a chain drive 6, the roll 3 being driven by chain 7 from a motor in a manner to be described. The roll 1 is guided for vertical movement in standards 8 which also support a vertically movable liner take-up, roll 9, upon which the liner will wind itself as the roll 1 is rotated.

Adjacent the stand 5 is arranged a second stand or framework 10 which extends longitudinally for a considerable distance, being constructed from upper parallel beams 11 and lower beams 12. Upon a platform 13 in the frame work is carried a motor 14 which, through suitable gearing 15, drives a shiftable clutch 16 which is connected to bevel gearing 17. A transverse shaft 18 is driven by the gearing described, which, through the sprocket chain 19, drives the shaft 20 which extends transversely of the framework, being mounted in bearings 21. The shaft 20 carries a sprocket 22 which drives the chain 7. The shaft 20 also supports the large drum 23 around which passes the belt or movable table to support the rubber, and in this manner the rubber is drawn from the roll at a speed properly correlated to the speed of rotation of the roll 1. By simultaneously driving the conveyor and the roll 1, stretching of the light, uncured rubber sheeting is avoided.

The endless belt or movable cutting table comprises a flexible belt 24 which is passed over the drum 23 and over a second drum 25 mounted in brackets 26 at the far end of the framework. The brackets 26 are adjustable to compensate for slack in the belt, by means of screws 27 as shown in Figure 3. To the belt 24 are attached a series of leaves or plates 28 which are of metal and which are secured along one edge by suitable rivets so that the belt may pass around the drums in the manner shown in Figures 1 and 3. The metal plates are provided so as to afford a cutting surface against which the operator cuts off the rubber with the sharp knives used for this purpose. On its upper run the belt is supported by a table 29, and on its lower run by parallel belts 30 which pass over pulleys 31 mounted in the framework.

In order to secure the rubber strips 2 to the movable conveyor or table, the several plates are provided with brackets 32 which are formed with overhanging portions 33 on the underside of which are notches 34. A pull rod or drag bar is provided for the operator, the central portion of which is tubular and filled with a wooden core, as shown at 35, and the ends of which are formed with pins or reduced extensions 37 receivable in the notches 34. Attached to the bar is a leather strip 38 which is flexible and of sufficient length so that it will embrace both of the strips of rubber sheeting and of sufficient width so that when the stick is placed in position as shown in Figure 8, the leather will bend slightly and clamp the rubber sheeting against the metal plate. The forward movement of the belt serves to bend the strip more firmly against the surface of the conveyor.

In order to prevent the belt or the leaves 28 from rising from the table, the several brackets 32 are provided with rollers 39 which pass under overhanging rails or strips 40. These rails are shown in Figures 5 and 6, but have been omitted from the other views for the sake of clearness.

The clutch for driving the belt is arranged to be operated by a lever 41 which is connected by linkage 42 to an operating rod 43 which is mounted for longitudinal movement along the framework so that the clutch can be operated from any point in front of the apparatus. The apparatus may also be provided with a measuring stick 45 slidable in the upper portion of the framework and adjustable by the operator to the points at which the rubber is to be cut.

The operation of the device is readily understandable by those skilled in the art. The operator clamps the leading end of the rubber strips to the metal plate by moving the bar 35 into position in the notches 34, the leather strip operating to secure a tight clamping engagement with the movable table. He then operates the clutch through the lever 41 and the conveyor moves forwardly, drawing the rubber out of the roll. At the same time the rolls 3 and 4 are revolved at the same speed as the table so that undue strain is not placed upon the rubber strip. When the strip has been drawn forwardly a proper distance, the movement of the conveyor is stopped and the rubber is cut transversely at the point indicated by the marker 45. The cut is usually made in the form indicated in Figure 4 by a sharp knife or roller operating against the metal leaves of the table. When the cut is made, the operator removes the drag bar from its location and replaces it in lugs 32 located rearwardly of the cut. When the conveyor is again started, the cut sections of rubber sheet are moved toward the end of the conveyor, where they can be removed and placed in books or transferred to the tube rolling tables.

Having described the invention in complete detail so as to enable it to be clearly understood, it will be appreciated that other forms or embodiments thereof may be made within the scope of the invention as defined herein.

What I claim is:

1. Apparatus for use in cutting strips to length from a reel of material comprising, a traveling conveyor, a stock rack located adjacent the conveyor, and means arranged to press the leading end of the stock against the surface of the conveyor to facilitate withdrawal of the stock from the rack by said conveyor.

2. In an apparatus of the character set forth, an endless conveyor, a rack located adjacent the conveyor, means on the rack to support a roll of tube stock, means to press the leading end of the tube stock to the conveyor, and means to rotate the roll of stock in unison with the movement of the conveyor.

3. In an apparatus of the character set forth, an endless conveyor having a cutting surface thereon, a stock rack adjacent the conveyor, and means to clamp the leading end of the stock in position so that it will be drawn out by the conveyor.

4. Apparatus for use in cutting strips of stock to length from an indefinite length of material comprising means for supplying the material, a traveling conveyor, and means adapted to press the leading portion of the material onto the surface of the conveyor to draw said material onto the conveyor from said supplying means.

5. In an apparatus of the character set forth, an endless conveyor, a metallic surfacing for the conveyor, and means associated with the conveyor for pressing tube stock thereon.

6. In a apparatus of the character set forth, an endless conveyor, a metallic surfacing for the conveyor, a bar, a clamping device carried by the bar, and brackets on opposite sides of the conveyor in which the bar may be received.

7. In an apparatus of the character set forth, an endless conveyor, means for driving the conveyor, a bar, a clamping device carried by the bar, brackets on opposite sides of the conveyor in which the bar may be received, and means for rotating a roll of tube stock, said means being arranged to be driven simultaneously with the movement of the conveyor.

8. In an apparatus of the character set forth, an endless flexible conveyor, metallic plates attached to the conveyor, a stock rack adjacent the conveyor, and a device arranged to extend transversely of the conveyor and adapted to press stock thereon.

9. In an apparatus of the character set forth, an endless flexible conveyor, metallic plates attached to the conveyor, a stock rack adjacent the conveyor, means on the stock rack to rotate a roll of stock, and means to drive the conveyor, the said means being connected together for simultaneous operation.

10. In an apparatus of the character set forth, an endless flexible conveyor, a stock rack adjacent the conveyor, rollers on said rack adapted to support and rotate a roll of stock, means to urge the leading end of the stock against the conveyor, means to move the conveyor, and driving connections between the conveyor and the said rollers.

11. In a device of the character set forth, a flexible conveyor belt, metallic plates secured to the belt, and a clamping bar supported transversely of the conveyor.

12. In a device of the character set forth, a flexible conveyor belt, metallic plates secured to the belt, and a clamping bar supported transversely of the conveyor, said clamping bar having a flexible gripping element associated therewith.

13. In a device of the character set forth, a flexible conveyor belt, a stock clamping bar, and means to secure the bar transversely of the belt.

14. In a device of the character set forth, a flexible conveyor belt, a stock clamping bar, a flexible gripping element thereon arranged to grip the stock on the belt, and means to move the bar with the belt.

15. In a device of the character set forth, a conveyor, a stock clamping bar, a flexible gripping element arranged to grip the stock on the conveyor, means to move the bar with the conveyor, and means to feed the stock to the conveyor.

16. In a device of the character set forth, a conveyor, a stock clamping bar, a gripping element on the bar arranged to grip the stock on the conveyor, a cutting surface on the conveyor, means to move the bar with the conveyor, and means to feed the stock to the conveyor.

17. Apparatus for use in cutting strips of material to length from a strip of material of indefinite length, said apparatus including means for supplying the material, a conveyor adapted to draw a length of material thereover, and a measuring stick mounted to move along the conveyor adapted to indicate where to cut the material to provide the desired length of strip.

18. Apparatus of the class described comprising a conveyor, means for supplying material to the conveyor, and means associated with and movable with respect to the conveyor for measuring a length of material thereon.

HORACE D. STEVENS.